United States Patent [19]
Kerihuel et al.

[11] Patent Number: 5,319,699
[45] Date of Patent: Jun. 7, 1994

[54] WIRELESS TELEPHONE SERVICE SUBSCRIBER CALL ROUTING METHOD

[75] Inventors: Jean-Bernard Kerihuel; Maurice Martin, both of Paris, France

[73] Assignee: Alcatel N.V., Amsterdam, Netherlands

[21] Appl. No.: 706,981

[22] Filed: May 29, 1991

[30] Foreign Application Priority Data

May 30, 1990 [FR]   France ............................... 90 06708

[51] Int. Cl.$^5$ ......................................... H04M 11/00
[52] U.S. Cl. ...................................... 379/58; 379/60; 370/110.1
[58] Field of Search .................................. 379/58–61; 455/33.1, 33.2, 34.1; 370/110.1

[56] References Cited

U.S. PATENT DOCUMENTS

| | | | |
|---|---|---|---|
| 4,748,655 | 5/1988 | Thrower et al. | 379/60 |
| 4,876,738 | 10/1989 | Selby | 455/33 |
| 5,040,177 | 8/1991 | Martin et al. | 379/61 |

FOREIGN PATENT DOCUMENTS

| | | | |
|---|---|---|---|
| 0212761 | 3/1987 | European Pat. Off. | |
| 0260763 | 3/1988 | European Pat. Off. | |
| 0290725 | 11/1988 | European Pat. Off. | 379/60 |
| 61-17783 | 8/1986 | Japan | |
| 2193861 | 2/1988 | United Kingdom | |

OTHER PUBLICATIONS

Auspurg, "Mobile telephone: an ideal IN application", *telcom report* 12 (1989) No. 5, pp. 152–155.
Dunogue et al, "the Building of Intelligent Networks", *commutation & transmission* No. 2—1989, pp. 5–22.

*Primary Examiner*—James L. Dwyer
*Assistant Examiner*—Dwayne D. Bost
*Attorney, Agent, or Firm*—Robbins, Berliner & Carson

[57] ABSTRACT

In a method of routing a call to a wireless telephone service subscriber entitled to the call routing service, the subscriber is assigned a numbering plan number. The number of the nearest fixed station is determined. The number of the nearest fixed station is written into the database of a service control point serving the subscriber. For each call to be routed, the nearest fixed station number is read from the database of the service control point. A word identifying the telephone is then sent to the fixed station designated by the nearest fixed station number. This fixed station then sends at least one call message containing the word identifying the telephone of the subscriber and the number of the fixed station. The call message is received by the telephone of the subscriber, the word identifying that telephone is recognized and the subscriber is alerted. A call is set up between the subscriber and the fixed station by sending from the subscriber's telephone to the fixed station a response message containing the word identifying the telephone and the number of that fixed station.

6 Claims, 5 Drawing Sheets

WIRELESS TELEPHONE SERVICE SUBSCRIBER CALL ROUTING METHOD

BACKGROUND OF THE INVENTION

1. Field of the invention

The invention concerns a method of routing calls to wireless telephone service subscribers.

2. Description of the Prior Art

A wireless telephone network comprises a plurality of fixed stations enabling subscribers to set up telephone calls to a public switched telephone network using portable telephones which communicate with the fixed stations by radio. The range of the fixed stations is short and there is no procedure for automatic handover of a call from one fixed station to another.

CROSS REFERENCE TO RELATED APPLICATIONS

Other applications of some of the concepts underlying the present invention are disclosed in the commonly assigned U.S. patent application filed on 16 Jul. 1990 under Ser. No. 552,965 and the three applications filed concurrently herewith under Ser. Nos. 07/706,765, 07/706,970, and 07/706,969. To the extent such copending applications may contain any additional information that might be of any assistance in the use and understanding of the invention claimed herein, they are hereby incorporated by reference.

To set up a call a subscriber must be within 100 to 200 meters of a fixed station. A user cannot receive calls. Known networks make no provision for routing a call to a subscriber as there is no known process for determining which fixed station a given subscriber is near at a given time. To remedy this drawback it is known to combine a conventional wireless telephone with a radio paging receiver including an alphanumeric display to tell the subscriber which telephone number to call to set up the required call. The drawback of this method is that it is impractical for the calling party and costly because it uses two telecommunications networks: the radiopaging network and the wireless telephone network.

One object of the invention is to propose a method which does not use a radiopaging network and which does not require the subscriber to set up the call to route the call to the subscriber if the subscriber is near a fixed station. Another object of the invention is to propose a method enabling a subscriber to move around within a predefined area covered by a plurality of other fixed stations without having to concern himself with reporting his movements within this area. A further object of the invention is to propose a method enabling a subscriber to enter another area which is not predefined, retaining the facility to receive telephone calls, provided that he uses a simple procedure to report his presence in that other area. A fourth object of the invention is to propose a method enabling a subscriber who has temporarily entered another area which is not predefined to limit the time for which calls are routed to said other area, so that calls are thereafter routed automatically to a fixed station which is usually the nearest fixed station to the subscriber and, as a subsidiary feature, to other fixed stations covering a predefined area in which the subscriber is occasionally located. A further object of the invention is to propose a method enabling the wireless telephone network operator to limit automatically the time for which calls are routed to an area other than the area in which a subscriber is usually located, to prevent calls being systematically routed to an area in which the subscriber never answers because he has left that area and forgotten to carry out the procedure to tell the network where he is now located.

The invention is particularly concerned with a wireless telephone service provided by an intelligent network to be described later.

SUMMARY OF THE INVENTION

The present invention consists in a method of routing a call to a subscriber to a wireless telephone service provided by a network comprising:

- a distribution network comprising fixed stations and wireless digital telephones linked to said fixed stations by radio;

- an integrated services digital public switched telephone network to which each fixed station is connected by a user to user signaling channel;

- service control points connected to said public switched telephone network and each comprising a wireless telephone subscriber database and a call processing logic device;

- a service management system comprising a reference database;

- said method consisting in, for each subscriber entitled to the call routing service:

- assigning that subscriber a number from the public switched telephone network numbering plan;

- determining a nearest fixed station number designating a fixed station which is deemed to be that nearest the subscriber;

- writing the nearest fixed station number into the database of said service control point serving said subscriber in association with said numbering plan number and a word identifying the telephone of said subscriber;

and, for each call to be routed to a called subscriber:

- reading in the database of the service control point serving said subscriber said nearest fixed station number and said word identifying said telephone of said subscriber;

- sending said word from said service control point to the fixed station designated by said nearest fixed station number over said user to user signaling channel of said fixed station and then clearing down said link;

- sending from said fixed station at least one call message containing said word and the number of said fixed station;

- receiving said call message in said telephone of said subscriber, recognizing said word identifying said telephone and alerting said subscriber; and

- setting up a link between said subscriber and said fixed station by sending from said telephone of said subscriber to said fixed station a response message containing said word identifying said telephone and containing the number of said fixed station.

This method enables a call to be routed automatically to a subscriber because the fixed station nearest the subscriber is determined beforehand and a number designating that fixed station has been written into the database of the service control point where it is associated with the numbering plan number and with a word identifying the subscriber's telephone. This enables this fixed station number to be accessed using as the key the subscriber's number from the numbering plan. A link can be set up between this fixed station and the subscriber without ambiguity as to the identity of the telephone which answers and without ambiguity as to the identity of the fixed station which captures this answer, because the fixed station sends a call message containing: the word identifying the telephone, which represents only one telephone, and the number identifying the fixed station. Only the telephone identified by this word answers and the only fixed station which responds to this answer is that designated by the fixed station number included in the answer message from the telephone.

A preferred method in accordance with the invention further consists in determining and then writing into said database of said service control point serving said subscriber at least one subsidiary fixed station number designating a fixed station likely to be that nearest said subscriber if the latter is not near the fixed station deemed to be the nearest;

and, if the called subscriber does not respond to call messages sent by said fixed station designated by said nearest fixed station number:

- reading in said database of said service control point each subsidiary fixed station number;

- sending said word identifying said telephone of said subscriber from said service control point to each subsidiary fixed station over said user to user signaling channel connecting said fixed station to said network;

- sending via each of said subsidiary fixed stations in parallel at least one call message containing said word identifying said telephone and said number of said fixed station sending said message.

This method enables the subscriber to move around in an area covered by a plurality of fixed stations without having to do anything to advise the network of his movements within this area as the number of the nearest fixed station and the numbers of the subsidiary fixed stations are determined beforehand and memorized.

A preferred method in accordance with the invention further consists in, to determine said nearest fixed station number and at least one subsidiary fixed station number, determining a nearest fixed station subscription agreement number and at least one subsidiary fixed station subscription agreement number by the operator of said wireless telephone network when said subscriber enters into a subscription agreement.

This method provides a very simple but difficult to modify method of determining the number of the fixed station near which the subscriber is usually located and the numbers of subsidiary fixed stations into the nearby location of which the subscriber may occasionally move. The subsidiary fixed points covered by the service agreement are usually, but not necessarily, fixed stations adjacent the nearest fixed station covered by the agreement. A subscriber might declare that he is usually near a fixed station serving his workplace and that outside working times he is near a fixed station serving his home, which may be at any distance from his workplace. The fixed station numbers are easy for the operator to determine either from the fixed station layout map or from a table listing all fixed stations in each geographical area.

A preferred method in accordance with the invention further consists in, to determine the nearest fixed station number and at least one subsidiary fixed station number, if any, after said subscriber moves into an area that is not predefined and is covered by one or more fixed stations:

- sending from said telephone of said subscriber to said service control point serving said subscriber via a fixed station near said subscriber a message requesting determination of a temporary nearest fixed station number and at least one temporary subsidiary fixed station number, if any;

- adding to said message when it passes through said fixed station a number designating said fixed station;

- authenticating the telephone which sent said message;

- writing the number of said fixed station into said database of said service control point associated with said numbering plan number and said word designating said telephone of said subscriber to constitute said temporary nearest fixed station number;

- reading a table of said database of said service control point to determine at least one number designating a fixed station near said fixed station deemed to be that nearest said subscriber;

- writing into said database of said service control point each number read from said table in association with said numbering plan number and said word designating said telephone, each number read constituting a temporary subsidiary fixed station number;

- predefining and then writing into said database of said service control point a temporary number expiry date and time associated with said numbering plan number and said word designating said telephone;

and, to read said nearest fixed station number:

- reading said subscription agreement number and said temporary nearest fixed station number and said expiry date and time;

- adopting as said nearest fixed station number said temporary nearest fixed station number if said expiry date and time have not been passed or said subscription agreement number otherwise;

- and, to read each subsidiary fixed station number:

- reading each subscription agreement number and each temporary subsidiary fixed station number and said expiry date and time;

- adopting as a subsidiary fixed station number each temporary subsidiary fixed station number if said expiry date and time have not been passed or each temporary number otherwise.

This method enables a subscriber to enter temporarily an area which is not predefined and which is served by one or more fixed stations other than the fixed stations designated in his subscription agreement, provided that he carries out a location procedure for determining a temporary nearest fixed station number and possibly one or more temporary subsidiary fixed station numbers. The subsidiary fixed stations can be determined automatically by reading a table, the temporary subsidiary fixed stations being always fixed stations adjacent the temporary nearest fixed station. The subscriber has no control over the determination of the temporary subsidiary fixed stations.

Setting an expiry date and time for these temporary numbers enables the nearest fixed station and subsidiary fixed station numbers in the subscription agreement to be reinstated without the subscriber or the network operator needing to take any action when the subscriber returns to his usual area. The subscriber can therefore return to his usual area without needing to remember to carry out a specific procedure to advise the network of this. The network is protected against misuse of the network in the form of routing calls in vain to an area in which the subscriber is no longer located because he has returned to his usual area. Two methods are proposed for predetermining the expiry date and time.

A preferred method in accordance with the invention further consists in, to determine said expiry date and time of said temporary fixed station numbers:

- entering a time period via the dialing keypad of said telephone of said subscriber after requesting determination of temporary fixed station numbers;
- transmitting said time period from said telephone of said subscriber to said service control point; and
- determining said expiry date and time of said temporary numbers from said time period.

This method enables the subscriber to use a single message to request the network to define his temporary location and to define himself an expiry date and time for the temporary fixed station numbers. This relies on the fact that the subscriber usually knows when he will be returning to his usual area. The service control point determines the date and the time at which this period ends and then writes these into its database where they are associated with the numbering plan number and with the word designating the subscription so that when a call is to be routed the service control point reads simultaneously: the subscription agreement numbers, the temporary numbers, the expiry date and time in a record accessible via the numbering plan number. The service control point compares the expiry date and time with the date and time at which the call is to be routed. If the expiry date and time have not yet been passed, it used the temporary fixed station numbers; otherwise it uses the subscription agreement fixed station numbers.

A preferred method in accordance with the invention further consists in, to determine said expiry date and time of said temporary fixed station numbers:

- setting a uniform expiry time period for all subscriptions; and
- calculating said expiry date and time of said temporary fixed station numbers for each subscription according to said uniform time period and the time at which said temporary numbers are determined.

The invention will be better understood and other details of the invention will emerge more clearly from the following description given by way of non-limiting example only with reference to the appended diagrammatic drawings.

DETAILED DESCRIPTION OF THE INVENTION

Figure 1:
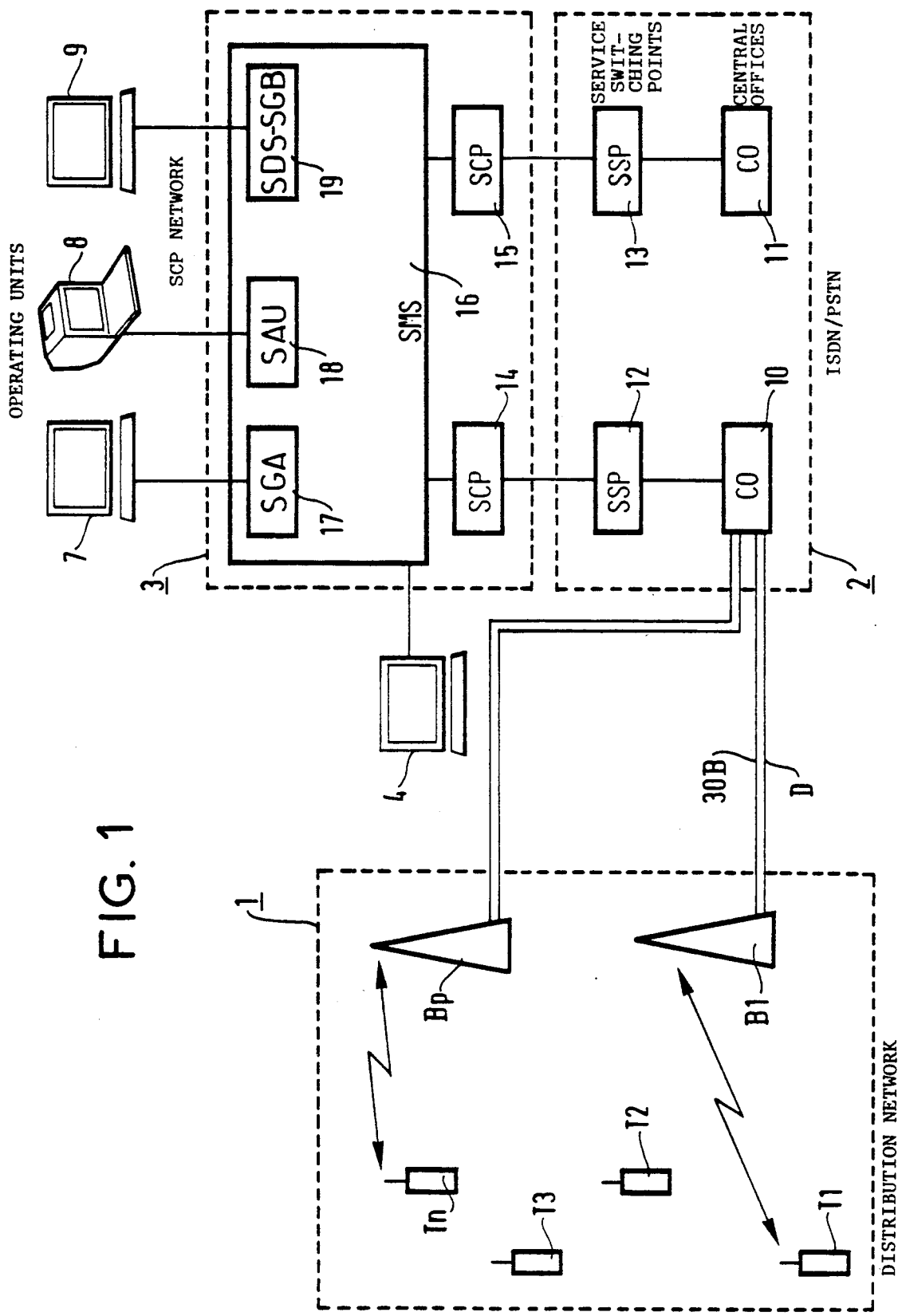
FIG. 1 is a block diagram of one example of a wireless telephone network using an intelligent network structure in which the method in accordance with the invention is implemented.

FIG. 1 is a block diagram of one example of an intelligent wireless telephone network in which a method in accordance with the invention is implemented. It comprises: a distribution network 1; an integrated services digital public switched telephone network 2; a service control point network 3; and administration units 4, 7, 8 and 9.

The distribution network 1 comprises portable wireless digital telephones T1 through Tn and fixed stations B1 through Bp. Each telephone can be linked by radio to a nearby fixed station. Each fixed station B1 through Bp can service several telephones at the same time and is connected by standard ports 5 to the public switched telephone network 2. Each standardized port to the network 2 provides a user to user signaling channel D and a number of telephone channels B. The number of telephone channels can be two for a base rate access port or 30 for a primary rate access port. These bidirectional telephone channels are switched in circuit mode. The bidirectional user to user signaling channel is switched in message mode. It is used to transmit data in parallel with telephony. A conventional application of this kind is to transmit the telephone number or the caller's name to a display on the called person's telephone terminal.

The public switched telephone network 2 is made up of central offices (CO) and service switching points (SSP). In this example the network comprises two central offices 10 and 11 connected to respective mobile service switching centers 12 and 13 by CCITT No 7 signaling links. The fixed stations B1 through Bp are connected to the central office 10.

In this example the service control point network 3 comprises two service control points (SCP) 14 and 15 and a service management system (SMS) 16. The network service control points 14 and 15 are connected to the respective service switching points 12 and 13 by CCITT No 7 signaling links and to the service management system 16 by CCITT X.25 links. Each operating unit 4, 7, 8 and 9 essentially comprises a screen-keyboard terminal. The terminals are assigned to different administration teams, the service management system 16 providing information and dialogue resources for each team.

The terminal 4 is assigned to the intelligent network technical operator. The terminal 9 is an ASCII or videotex terminal assigned to a technical operator of the set of fixed stations or of a particular subset of fixed stations. It accesses the database of the service management system 16 via a fixed station management server (SGB) and a statistics server (SDS) combined in a single unit 19. The optional terminal 8 is a videotex terminal enabling a subscriber to consult service data: subscription data and billing tickets. It accesses the service management system 16 via a user access server (SAU) 18. The terminal 7 is a videotex terminal assigned to the wireless telephone service sales operator. It accesses the service management system 16 via a subscriber management server (STA) 17.

Each fixed station B1 through Bp includes a controller which supervises telephone channel interfaces (standard ports 5) and radio channel interfaces. This controller has the following functions:

- initialization of a call to the network when a radio channel is seized by a telephone T1 through Tn;
- contributing to the caller authentication procedure;
- analyzing information received on the radio channels;
- supervising the radio channels.

A call for service from a public network 2 user is analyzed in the mobile service switching center 12 or 13 and then passed to the respective service control point 14 or 15. The service control point then controls call processing and the mobile service switching center in respect of all actions requiring switching resources: for example: to send a recorded announcement, or to set up a connection between a network input and a network output, or to introduce a time-delay. Service control point software for each service organized as a string of basic actions processes each call on the basis of messages received. It also has access in real time to a database.

The service management system 16 is not involved in call processing. However, it contains in a database the service software and the subscriber data and therefore constitutes a reference source for the service. It handles technical administration of the network of service control points 14 and 15, in particular to maintain database consistency; it also handles commercial administration of the service: contract management, operator access, subscriber access.

The service control points 14 and 15 and the service management system 16 may be in the form of an AL-CATEL8300 multiprocessor marketed by the ALCATEL company, for example.

The service control points 14 and 15 implement the wireless telephone service access method. Each includes a wireless telephone service subscriber database containing data relating to some or all service subscribers. This database is updated by the service management system 16 and all the databases of the service control points 14 and 15 are updated virtually simultaneously, immediately the service management system 16 is advised of any modification relating to the subscribers by one of the administration centers 4, 7, 8 or 9.

The database of the service control points 14 and 15 and the service management system 16 includes the following data on each subscriber:
- a subscription identification word IDAB;
- a telephone identification word IDCP;
- a secret key Ki specific to the subscriber;
- a subscription service and service operator identification word IDSO;
- the type of subscription: international, enabling all calls without restriction; or national, authorizing calls in a single country; or selective, authorizing calls to numbers in a predefined list;
- the numbers the subscriber is authorized to access, in the case of a selective type subscription;
- the account debit ceiling;
- the expiry date of the subscription;
- the numbering plan number that can be used to call the subscriber's wireless telephone;
- the subscription agreement number of the fixed station nearest the subscriber;
- the subscription agreement numbers of the subsidiary fixed stations, if any, and if the subscriber has additionally subscribed to the facility to receive calls via fixed stations other than the nearest fixed station and as predefined in the subscription agreement;
- the number of the fixed station which is temporarily that nearest the subscriber, if the subscriber has reported a new location and if the subscriber has additionally subscribed to the facility to receive calls via two clusters of fixed stations: a cluster covering his usual places of work and domicile and a cluster covering temporary places that are not predefined;
- the temporary subsidiary fixed station numbers; and
- the expiry date and time for said temporary numbers.

Figure 2:
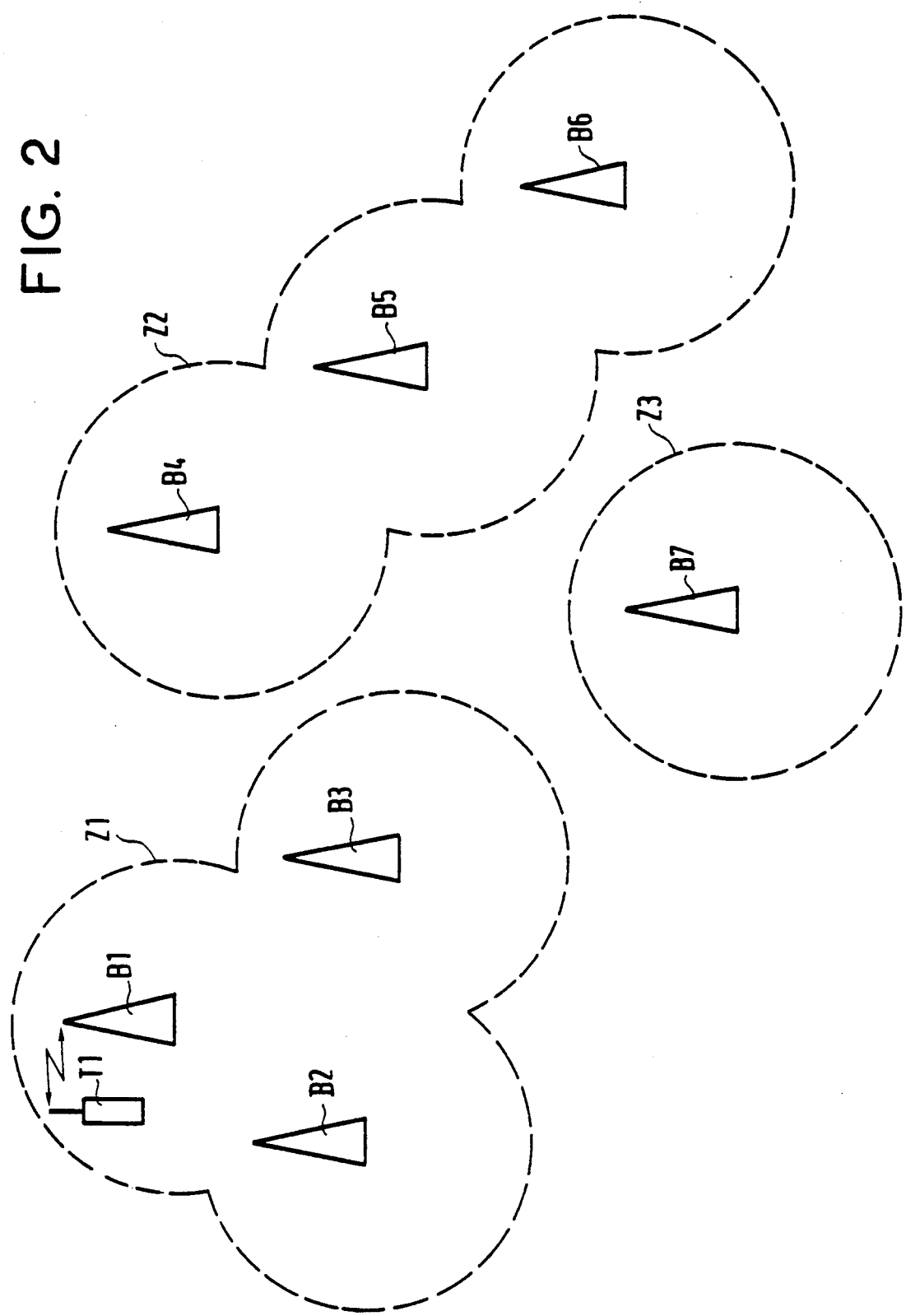
FIG. 2 is a diagram showing several areas served by separate clusters of fixed stations.

FIG. 2 is a diagram showing three geographical areas Z1, Z2 and Z3 in which coverage is provided by three clusters of fixed stations. The area Z1 is covered by the fixed stations B1, B2 and B3. The area Z2 is covered by the fixed stations B4, B5 and B6. The area Z3 is covered by a single fixed station B7.

When a subscriber enters into a wireless telephone service subscription agreement including the facility for calls to be routed to him, he tells the wireless telephone network sales operator his usual location. The sales operator deduces from this information that the subscriber is usually near fixed station B1, for example.

The subscriber indicates how much he tends to move around. The operator deduces from this that he moves around in the area Z1 covered by the fixed station B1 and by the fixed stations B2 and B3, with reference to a map or to a table listing the fixed stations in each area. The subscriber might work in one building at an airport, for example, but knows that he occasionally visits two other buildings on the airport.

In this case, the operator writes into the database of the service control point 14 which serves the subscriber in question a nearest fixed station agreement number in the form of the number of the fixed station B1 and two subsidiary fixed station numbers in the form of the numbers of the fixed stations B2 and B3.

This information enables the service control point 14 to route a call to the subscriber, starting by attempting to set up a link to the telephone T1 of the subscriber via the fixed station B1. The fixed station B1 then sends a call message to the telephone T1 of the subscriber. If the fixed station B1 does not receive any response from the telephone T1 the service control point 14 attempts to set up a link via the fixed stations B2 and B3 simultaneously, to avoid the calling party having to wait too long.

Assume that the subscriber has additionally subscribed to the facility to receive calls via another cluster of fixed stations that is not predefined. For example, the subscriber might enter the area Z2 near the fixed station B4. He uses the keypad of his telephone T1 to initiate the automatic determination of the fixed station nearest to him and the automatic determination of subsidiary fixed stations belonging to a cluster of fixed stations covering the geographical area identified by the fixed station nearest the subscriber. In this example the fixed station B4 picks up the message sent by the subscriber's telephone and informs the service control point 14 that the subscriber is near the fixed station B4. The service control point 14 looks up a table which tells it that the fixed station B4 is in the geographical area Z2 and that this area is covered by the fixed stations B4, B5 and B6. It deduces from this that the fixed station B5 and B6 are the adjacent fixed stations to be used as subsidiary fixed stations for routing calls to the subscriber if routing to the fixed station B4 does not generate a response from the subscriber.

The number designating the fixed station B4 is the temporary nearest fixed station number and the numbers designating the fixed stations B5 and B6 are the temporary subsidiary fixed station numbers. These temporary numbers are used instead of the subscription agreement numbers for a certain time. There may be more or less temporary numbers than subscription agreement numbers. The subscription agreement numbers are not deleted from the database of the service control point when the temporary numbers are determined and written into the database.

In this embodiment the temporary numbers have one of two expiry times. The subscriber can indicate an expiry time to the service control point 14. The network operator sets another time (one day, for example) which is the same for all subscribers and which is the expiry time for temporary numbers for all subscribers who have not specified an expiry time. This uniform time set by the operator prevents calls immobilizing network resources when they cannot be connected through because the called subscriber has left the area in which he was temporarily located.

An expiry date and time are written into the database of the service control point 14 each time that a new set of temporary fixed station numbers is written into the subscription data. The expiry date and time are computed by the service control point 14 on the basis of the date and the time at which the temporary fixed station numbers were determined and on the basis of either the expiry time period indicated by the subscriber using his dialing keypad or the uniform expiry time period set by the operator if no expiry time period is indicated by the subscriber.

If the subscriber were to enter the area Z3 served by a single fixed station B7, the procedure for determining the nearest fixed station would conclude that this is the fixed station B7 and the procedure for determining the subsidiary fixed stations would conclude that there are no subsidiary fixed stations. A standard value characterizing the absence of subsidiary fixed stations is then written into the database as a temporary subsidiary fixed station number. An expiry date and time are determined in a similar way to the situation in which there are subsidiary fixed stations.

Figure 3:
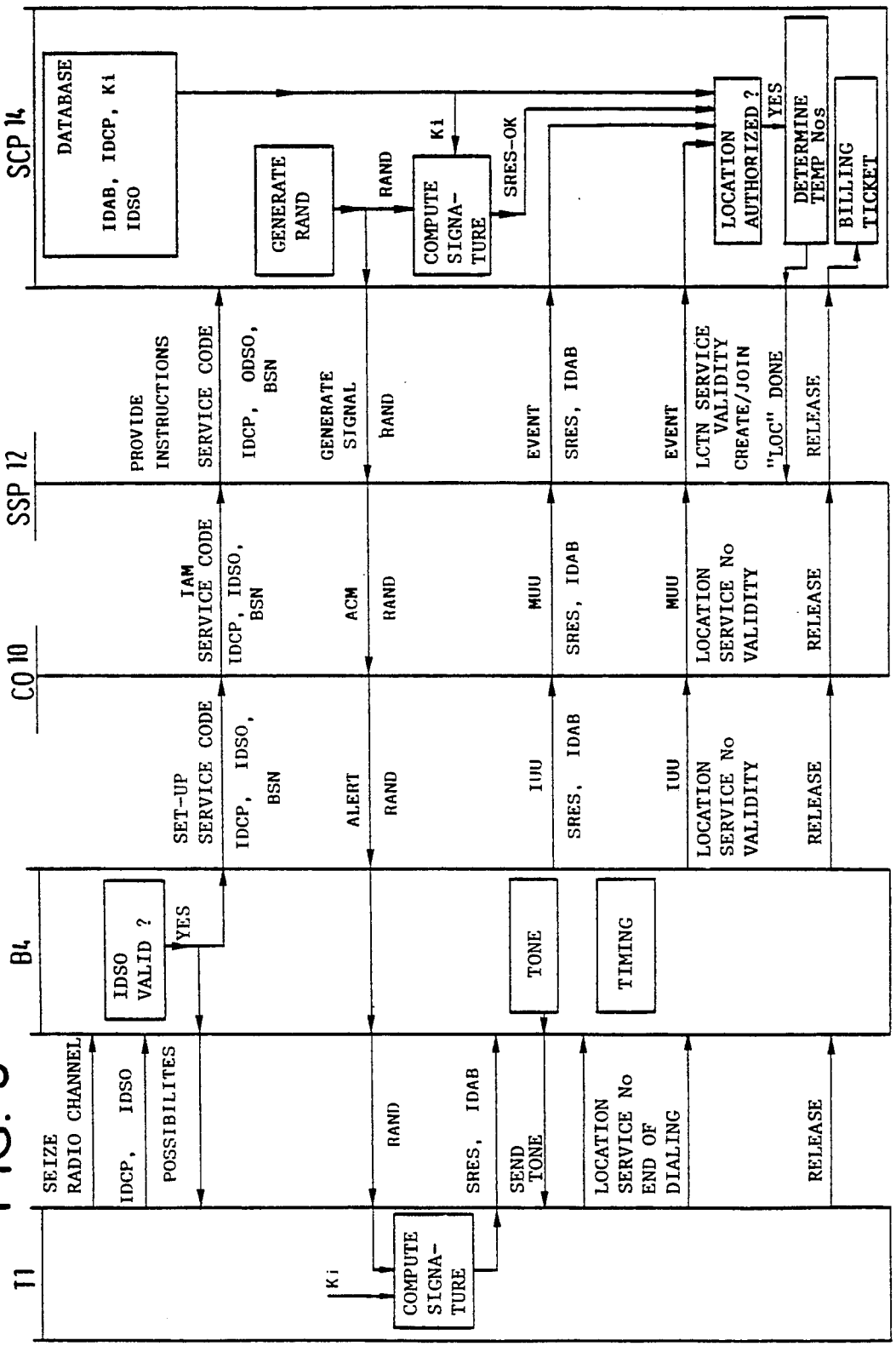
FIG. 3 is a timing diagram showing one embodiment of the method in accordance with the invention and in particular the stage in which the number of the fixed station temporarily nearest a subscriber is determined.

FIG. 3 is a timing diagram showing the information exchanged during the procedure for determining the temporary nearest fixed station number. The time axis runs from the top to the bottom of the figure. First the caller enables his telephone by entering his confidential code on the telephone keypad. The code is verified by the telephone itself. Enabling of the telephone is followed by the seizure of a radio channel to establish the nearby fixed station B4, using a standard, conventional procedure.

The telephone T1 then transmits two words IDCP and IDSO to the fixed station B4. The word IDSO designates the wireless telephone service and its operator. The word IDCP designates the telephone T1. The fixed station B4 verifies that the word IDSO designates a known operator and then sends to the telephone T1 a message to indicate that it can access the requested service.

At the same time the fixed station B4 sends to the central office 10 a SET-UP message complying with the No 7 protocol and including a field reserved for user to user signaling. This field contains: a code word designating the requested service, in other words the wireless telephone service; the words IDCP and IDSO; and a word (number) BSN designating the fixed station B4. The central office 10 sends a message IAM containing the same words to the service switching point 12. The latter sends to the service control point 14 a PROVIDE INSTRUCTIONS message containing the same words.

The service control point 14 then generates a random number RAND and sends it to the mobile service switching service 12 in a GENERATE SIGNAL message, in the field reserved for user to user signaling. The mobile service switching center 12 sends a message ACM to the central office 10 containing the random number RAND. The central office 10 forwards the random number RAND to the fixed station B4 in an ALERT MESSAGE. The fixed station B4 forwards the random number RAND to the telephone T1 which uses it to calculate a signature SRES using a secret key Ki stored in the telephone T1 and known only to one subscriber. The signature is calculated using a conventional encryption algorithm.

The key Ki is stored in a protected module which plugs into the telephone T1 to customize it for a particular subscriber. This plug-in module also contains the word IDAB which designates the subscriber independently of the word IDCP which designates the telephone T1 into which the module is plugged. The telephone T1 sends to the fixed station B4 the word SRES constituting its signature and the word IDAB. The fixed station B4 then sends to the telephone T1 a tone inviting the caller to dial the called party number.

The fixed station B4 transmits the words SRES and IDAB to the central office 10 in a message IUU. The central office 10 forwards them to the service switching point 12 in a message MUU. The service switching point 12 forwards them to the service control point 14 in a message EVENT.

The subscriber enters a number on his keypad. This number designates a location service provided by the service control point and which determines the temporary nearest fixed station number and one or more temporary subsidiary fixed station numbers if there are nearby fixed stations. The service number is followed by two digits indicating the expiry time of the temporary fixed station numbers, in other words the time at which the subscriber will leave the area Z2. If the subscriber will be there for more than 24 hours, the expiry date is also given.

The fixed station B4 introduces the usual time-delays between the digits of the number. The caller ends input of the number with an end of dialing signal which triggers sending of the called party number from the fixed station B4 to the central office 10 in a message IUU. The central office 10 forwards the called party number to the service switching point 12 in a message MUU. The service switching point 12 forwards the called party number to the service control point 14 in a message EVENT.

The service control point 14 must authenticate the caller and verify that the caller is authorized to access the called party number. The service control point 14 determines a reference signature SRES-OK on the basis of the random number RAND and the secret key Ki for the subscription designated by the word IDAB, reading this word in its database. The algorithm used for this is the same as the algorithm used in the telephone T1. It depends on the service operator, as determined from the word IDSO sent by the telephone T1.

The service control point 14 checks what it receives from the network against the content of its database in several ways. It verifies that the signal SRES is identical to the reference signal SRES-OK to identify any fraudulent misuse of the words IDAB and IDCP of a subscriber as a result of intercepting them. It verifies that the word IDAB identifying the subscription represents a valid subscription.

The service control point 14 also verifies that the subscriber has subscribed to the call routing service. If the result of any check is negative the subscriber is refused access to the location function. A tone or a recorded announcement tells the subscriber this, after which the service control point 14 releases the link.

If the results of all the checks are positive the service control point 14 writes the number of the fixed station B4 into its database as the number of the fixed station temporarily nearest the subscriber. It then determines the temporary subsidiary fixed station numbers B5 and B6 by looking up in a table in its database the numbers of the fixed stations in the same area Z2 as the fixed station B4. It then writes the numbers of these fixed stations B5 and B6 into its database as temporary subsidiary fixed station numbers. It then determines and writes into its database the expiry date and time for these temporary fixed station numbers.

If the subscriber has indicated an expiry time period, after dialing the number requesting access to the location service the date which is written is the date at which the location process is carried out and the time which is written is the time indicated by the subscriber. If the subscriber has not indicated any expiry time period, the service control point 14 computes a date and a time based on the date and the time of the current location process and the expiry time period set by the operator for all subscribers. The date and the time determined in this way are written into the database.

The service control point 14 sends to the service switching point 12 a message CREATE/JOIN which includes a message indicating that the subscriber has been located. This message is forwarded to the subscriber's telephone T1 over the link set up previously. The telephone T1 then clears down the link which causes the service control point 14 to generate a billing ticket. The network is then ready to route calls to the subscriber who is at this time in the area Z2 which is not the area in which he is usually located.

Figure 4:
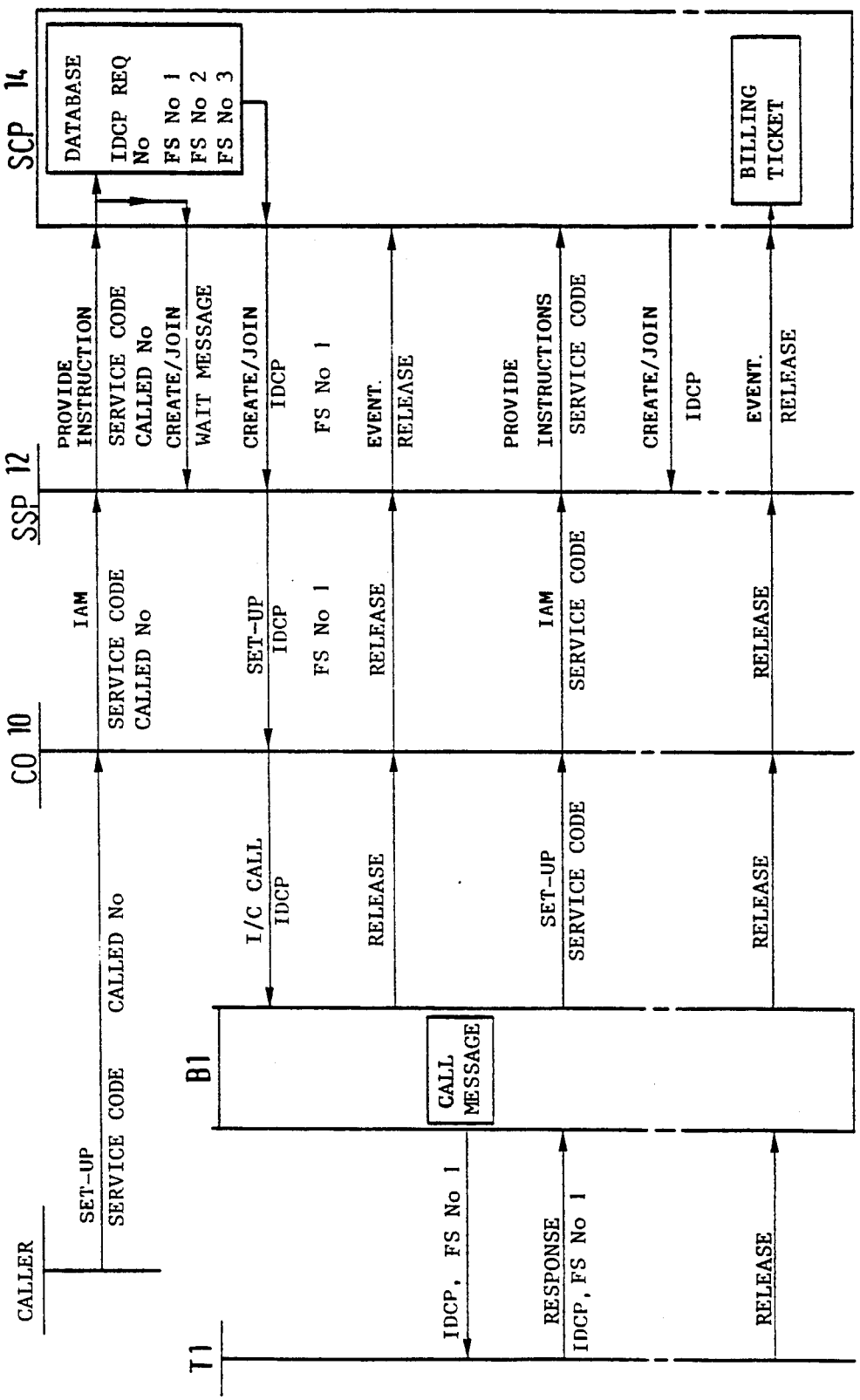
FIG. 4 is a timing diagram showing one embodiment of the method in accordance with the invention for routing a call to a subscriber who is near the fixed station designated by the nearest fixed station number.

FIG. 4 is a timing diagram showing the information exchanged when routing a call to the subscriber when in his usual area Z1 near the fixed station B1 which is the fixed station he is usually nearest. There is no currently valid temporary number. The service control point 14 therefore routes each call via the fixed station B1 and via the subsidiary fixed stations B2 and B3 indicated by the subscription agreement numbers.

The time axis runs from the top to the bottom of the figure. The subscriber starts the call by using a telephone terminal to send a message SET/UP to its central office 10. This message includes a codeword designating the wireless telephone service and a called party number which designates the subscriber in the public switched telephone network numbering plan. The central office 10 transmits the information to the service switching point 12 in a message IAM. The service switching point 12 forwards the information to the service control point 14 in a message PROVIDE INSTRUCTION. The service control point 14 causes a "please wait" message to be sent to the caller by sending to the service switching point 12 a message CREATE/JOIN.

It searches its database for information needed to route the call: the subscription agreement number for the nearest fixed station, the subscription agreement numbers for the subsidiary fixed stations, the temporary nearest fixed station number, the subsidiary fixed station numbers, the temporary number expiry date and time. It deduces from this information the numbers of the fixed stations to be used to route the call: FSNo1, FSNo2, FSNo3, which designate the fixed stations B1, B2, B3, in this example for which there are no valid temporary numbers.

The database also supplies the word IDCP which designates the telephone T1 represented by the numbering plan number sent by the caller. The word IDCP will be used instead of the numbering plan number to set up a link through the network. The service control point 14 sends the word IDCP and the number FSNo1 of the nearest fixed station to the service switching point 12 in a message CREATE/JOIN. The service switching point 12 forwards this information to the central office 10 in a message SET-UP. The central office 10 forwards the word IDCP to the fixed station B1 in a message INCOMING CALL.

The fixed station B1 then causes the link to be releasing by routing a RELEASE message to the service control point 14 via the central office 10 and the service switching point 12. The fixed station B1 sends a call message to the telephone T1 containing the word IDCP and its fixed station number FSNo1.

The telephone T1 is on standby, scanning the 40 radio channels used for communications between the telephone and the fixed stations successively until it detects a call message containing the word IDCP designating it. When it detects this message it seizes the same radio channel. Each channel is used in both directions alternately. The telephone T1 sends a response message including: a pattern characteristic of a response to a call; the word IDCP identifying the telephone T1; and the number FSNo1 designating the fixed station B1. The latter receives this response message and recognizes its own fixed station number.

Nearby fixed stations may also receive the response message but they do not recognize their fixed station number and consequently do not interfere with the fixed station B1 as it attempts to set up a call. The fixed station B1 verifies that the telephone which responds sends the same word IDCP as that sent in the call message, in order to prevent any possibility of confusion if more than one telephone is sending a response message at the same time. The fixed station B1 then sends to the central office 10 a message SET-UP containing a codeword designating the wireless telephone service in order to set up a call as in the case of a call at the initiative of the subscriber. The central office 10 sends to the service switching point 12 a message IAM containing the codeword designating the service. The service switching point 12 sends a message PROVIDE INSTRUCTIONS containing the codeword designating the service to the service control point 14. The latter causes a link to be set up by remote control by sending a message CREATE/JOIN containing the word IDCP designating the telephone T1 to the service switching point 12.

A little later, when the call is finished, the subscriber using the telephone T1 causes the link to be released. The telephone T1 sends a message to release the link and the fixed station B1 forwards a release instruction through the central office 10 and the service switching point 12. The service control point 14 then generates a billing ticket.

Figure 5:
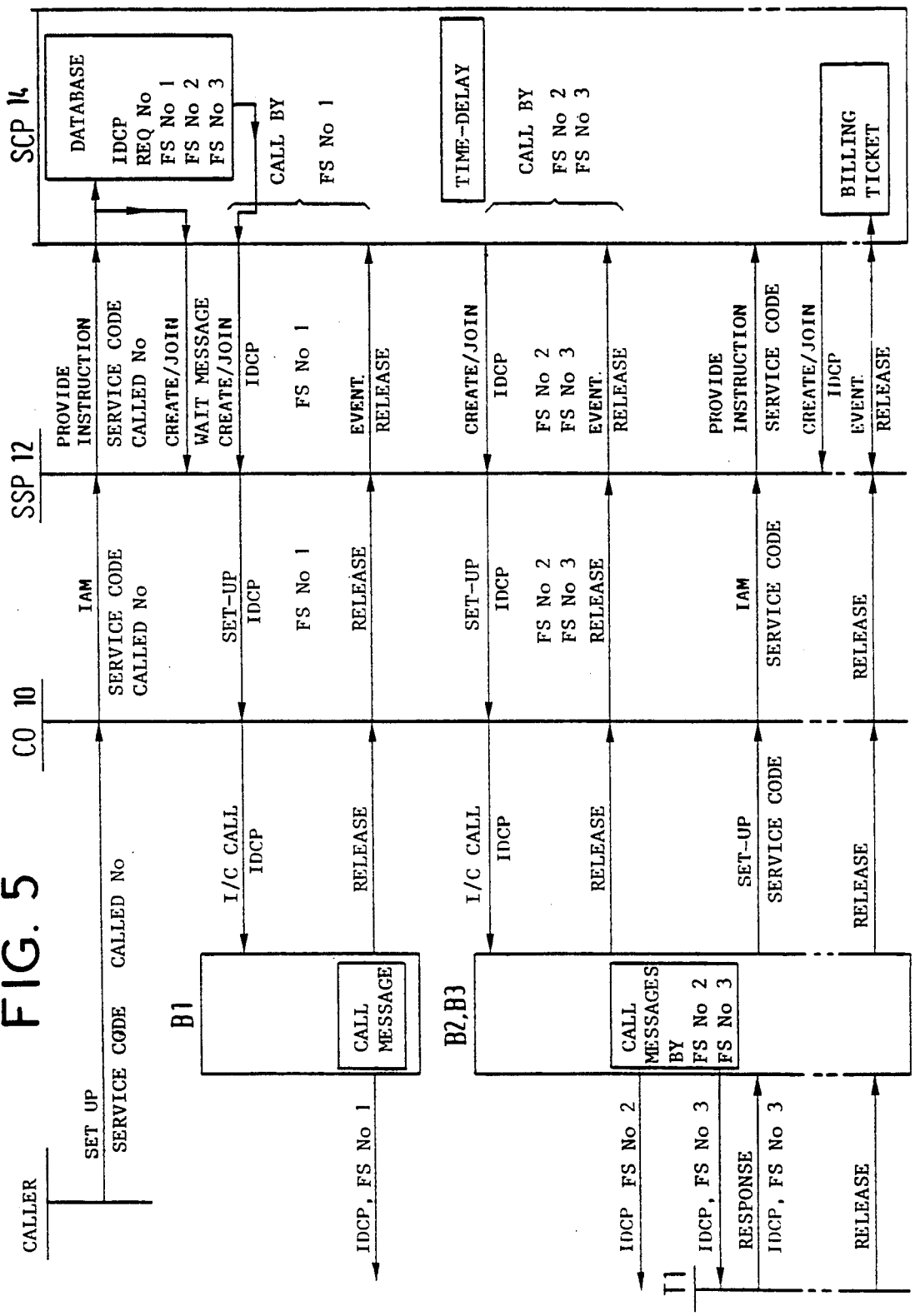
FIG. 5 is a timing diagram showing one embodiment of the method in accordance with the invention for routing a call to a subscriber who is near one of the subsidiary fixed stations.

FIG. 5 is a timing diagram showing the information exchanges when the telephone T1 does not respond to the fixed station B1 because the subscriber has moved into the area Z1 and is near the fixed station B3. The diagram is the same as the FIG. 4 diagram up to release of the link set up between the service control point 14 and the fixed station B1 to send a call message. If there is no response from the subscriber, the service control point 14 waits for a period set by a time-delay program and then sets up a link with the fixed stations B2 and B3 simultaneously, these fixed stations being designated by the subsidiary fixed station numbers FSNo2 and FSNo3.

The fixed stations B2 and B3 are caused to send call messages containing the word IDCP and containing their respective numbers FSNo2 and FSNo3, in a similar way to that described above for the fixed station B1. In this example the call message sent by the fixed station B3 is not received by the telephone T1. The call message sent by the fixed station B3 is received, however, and causes a response message to be sent containing both the word IDCP identifying the telephone T1 and the number FSNo3 of the fixed station which sent the call message. The fixed station B3 receives this response message and verifies that it is a response addressed to it and that it is the telephone identified by the word IDCP sent that is responding. If the results of these checks are positive the fixed station B3 requests a call to be set up in the manner described above with reference to FIG. 4. The link is also cleared down as previously described.

Consider the situation where this subscriber is outside his usual area Z1. He has asked the location service to determine the temporary nearest fixed station number and temporary subsidiary fixed station numbers. Assume that these numbers have not yet expired. The temporary nearest fixed station number is the number designating the fixed station B4, for example, and the temporary subsidiary fixed station numbers are the numbers designating the fixed stations B5 and B6. The information exchanged to route a call to the subscriber is then similar to that described above with reference to FIGS. 5 and 6 but the numbers FSNo1, FSNo2 and FSNo3 are then the numbers designating the fixed stations B4, B5 and B6, respectively.

There is claimed:

1. Method of routing a call to a subscriber to a wireless telephone service network including a distribution network having fixed stations and wireless digital telephones linked to said fixed stations by radio an integrated services digital public switched telephone network to which each of the fixed stations is connected by one or more circuit switched telephone channels and a message mode switched user to user signaling channel, service control points connected to said public switched telephone network and each containing a wireless telephone subscriber database and a call processing logic device, and a service management system containing a reference database, said method comprising, for each subscriber entitled to call routing services, the steps:

assigning that subscriber a number from a public switching telephone network numbering plan;

determining a primary fixed station number designating a fixed station deemed to be nearest the subscriber;

writing the primary fixed station number into the database of a service control point serving said subscriber in association with said numbering plan number and a word identifying the telephone of said subscriber;

and, for each call to be routed to a called subscriber, the additional steps:

reading from the database of the service control point serving said subscriber, said primary fixed station number and said word identifying said telephone of said subscriber;

sending said word from said service control point to the fixed station designated by said primary fixed station number over a link of said user to user signaling channel of said primary fixed station and then freeing said link;

sending from said fixed station at least one call message containing said word and said primary fixed station number;

receiving said call message in said telephone of said subscriber, recognizing said word identifying said telephone and alerting said subscriber; and setting up a link between said subscriber and said fixed station by sending from said telephone of said subscriber to said fixed station a response message containing said word identifying said telephone and containing said primary fixed station number.

2. Method according to claim 1, further comprising the step:

determining and then writing into said database of said service control point serving said subscriber at least one subsidiary fixed station number designating a subsidiary fixed station likely to be that nearest said subscriber if the subscriber is not near the primary fixed station designated by the primary fixed station number;

and, if the called subscriber does not respond to call messages sent by the station designated by said primary fixed station number, the additional steps:

reading from said database of said service control point each subsidiary fixed station number;

sending to each subsidiary fixed station designated by a respective said subsidiary fixed station number, said word identifying said telephone number of said subscriber from said service control point over said user to user signaling channel connecting said each subsidiary fixed station to said network; and sending simultaneously via each of said subsidiary fixed stations at least one call message containing said word identifying said telephone and said number of said fixed station sending said message.

3. Method according to claim 2, further comprising, to determine said nearest fixed station number and at least one subsidiary fixed station number, the additional step:

determining a nearest fixed station subscription agreement number and at least on subsidiary fixed station subscription agreement number by the operator of said wireless telephone network when said subscriber enters into a subscription agreement.

4. Method according to claim 2, further comprising, to determine the nearest fixed station number and at least one subsidiary fixed station number, if any, after said subscriber moves into an area that is not predefined and is covered by one or more fixed stations, the additional steps:

sending from said telephone of said subscriber to said service control point serving said subscriber via a fixed station near said subscriber a message requesting determination of a temporary nearest fixed station number and at least one temporary subsidiary fixed station number, if any;

adding to said message when it passes through sad fixed station a number designating said fixed station;

authenticating the telephone which sent said message;

writing the number of said fixed station into said database of said service control point associated with said numbering plan number and said word designating said telephone of said subscriber to constitute said temporary nearest fixed station number;

reading a table of said database of said service control point to determine at least one number designating a fixed station near said fixed station deemed to be that nearest said subscriber;

writing into said database of said service control point each number read from said table in association with said numbering plan number and said word designating said telephone, each number read constituting a temporary subsidiary fixed station number; and predefining and then writing into said database of said service control point a temporary number expiry date and time associated with said numbering plan number and said word designating said telephone;

wherein said step of reading said nearest fixed station number further comprises the steps:

reading a subscription agreement nearest fixed station number and said temporary nearest fixed station number and said temporary number expiry date and time; and adopting as said nearest fixed station number said temporary nearest fixed station number if said expiry data and time have not been passed, otherwise adopting said subscription agreement number;

and said step of reading said one or more subsidiary fixed station numbers further comprises the steps:

reading at least one subscription agreement subsidiary fixed station number and each said temporary subsidiary fixed station number and said expiry date and time; and adopting as a subsidiary fixed station number each said temporary subsidiary fixed station number is said expiry date and time have not been passed, otherwise adopting each said subscription agreement subsidiary fixed station number.

5. Method according to claim 4, further comprising, to determine said expiry date and time of said temporary fixed station numbers, the additional steps:

entering a time period via the dialing keypad of said telephone of said subscriber after requesting determination of temporary fixed station numbers;

transmitting said time period from said telephone of said subscriber to said service control point; and determining said expiry date and time of said temporary numbers from said time period.

6. Method according to claim 4, further comprising, to determine said expiry date and time of said temporary fixed station numbers, the additional steps:

setting a uniform expiry time period for all subscriptions; and calculating said expiry date and time of said temporary fixed station numbers for each subscription according to said uniform time period and the time at which said temporary numbers are determined.

* * * * *